(12) United States Patent
Prestia et al.

(10) Patent No.: US 11,457,658 B2
(45) Date of Patent: Oct. 4, 2022

(54) METHOD FOR PRODUCING A BOBBIN COMPRISING ALKALOIDS CONTAINING MATERIAL

(71) Applicant: PHILIP MORRIS PRODUCTS S.A., Neuchatel (CH)

(72) Inventors: Ivan Prestia, Longara di Calderara di Reno (IT); Michele Del Borrello, Vasto (IT); Yorick Klipfel, St-Saphorin-sur-Morges (CH)

(73) Assignee: Philip Morris Products S.A., Neuchatel (CH)

( * ) Notice: Subject to any disclaimer, the term of this patent is extended or adjusted under 35 U.S.C. 154(b) by 189 days.

(21) Appl. No.: 16/493,876

(22) PCT Filed: Mar. 28, 2018

(86) PCT No.: PCT/EP2018/057939
§ 371 (c)(1),
(2) Date: Sep. 13, 2019

(87) PCT Pub. No.: WO2018/178161
PCT Pub. Date: Oct. 4, 2018

(65) Prior Publication Data
US 2020/0337360 A1 Oct. 29, 2020

(30) Foreign Application Priority Data
Mar. 29, 2017 (EP) .................................. 17163657

(51) Int. Cl.
*A24B 3/14* (2006.01)
*A24B 15/14* (2006.01)
(Continued)

(52) U.S. Cl.
CPC ................ *A24B 3/14* (2013.01); *A24B 15/14* (2013.01); *A24B 15/186* (2013.01); *B32B 5/16* (2013.01);
(Continued)

(58) Field of Classification Search
CPC ........... A24B 15/12; A24B 15/14; A24B 3/14; B32B 37/0053; B32B 37/20; B32B 37/26;
(Continued)

(56) References Cited

U.S. PATENT DOCUMENTS

| 3,343,546 A | 9/1967 | Ernest-Rolf |
| 5,902,431 A | 5/1999 | Wilkinson |

(Continued)

FOREIGN PATENT DOCUMENTS

| JP | S61186984 | 8/1986 |
| JP | 2015-517818 | 6/2015 |

(Continued)

OTHER PUBLICATIONS

PCT Search Report and Written Opinion for PCT/EP2018/057939 dated Jun. 28, 2018 (12 pages).
(Continued)

Primary Examiner — John L Goff, II
(74) Attorney, Agent, or Firm — Mueting Raasch Group

(57) ABSTRACT

The invention relates to a method for producing a bobbin comprising a plurality of wounds of a laminated sheet, the method comprising the steps of: •providing a continuous sheet of alkaloids containing material having a free surface; •providing a continuous sheet of a first protective material having a free surface; •adhering the free surface of the continuous sheet of the first protective material to the free surface of the continuous sheet of alkaloids containing material to form a continuous laminated sheet comprising at least one layer of alkaloids containing material and at least (Continued)

one layer of a first protective material, wherein said at least one layer of alkaloids containing material and said at least one layer of a first protective material define an adhesion surface between them; •feeding said laminated sheet to a rotatable center core; •rotating the center core so as to wind said continuous laminated sheet around it in such a way to form said bobbin comprising a plurality of wounds of a continuous laminated sheet comprising at least one layer of alkaloids containing material and at least one layer of a first protective material.

7 Claims, 6 Drawing Sheets

(51) Int. Cl.
| | |
|---|---|
| *A24B 15/18* | (2006.01) |
| *B32B 5/16* | (2006.01) |
| *B32B 19/04* | (2006.01) |
| *B32B 23/12* | (2006.01) |
| *B32B 27/14* | (2006.01) |
| *B32B 27/32* | (2006.01) |
| *B32B 27/36* | (2006.01) |
| *B32B 37/00* | (2006.01) |
| *B32B 37/20* | (2006.01) |
| *B32B 37/26* | (2006.01) |
| *B65H 18/28* | (2006.01) |
| *B65H 39/16* | (2006.01) |
| *B32B 38/18* | (2006.01) |
| *A24C 5/01* | (2020.01) |

(52) U.S. Cl.
CPC .......... *B32B 19/045* (2013.01); *B32B 19/046* (2013.01); *B32B 23/12* (2013.01); *B32B 27/14* (2013.01); *B32B 27/32* (2013.01); *B32B 27/322* (2013.01); *B32B 27/36* (2013.01); *B32B 37/0053* (2013.01); *B32B 37/20* (2013.01); *B32B 37/26* (2013.01); *B32B 38/18* (2013.01); *B65H 18/28* (2013.01); *B65H 39/16* (2013.01); *A24C 5/01* (2020.01); *B32B 2037/268* (2013.01); *B32B 2264/06* (2013.01); *B32B 2309/105* (2013.01); *B32B 2317/00* (2013.01); *B32B 2317/12* (2013.01); *B32B 2323/04* (2013.01); *B32B 2323/10* (2013.01); *B32B 2327/18* (2013.01); *B32B 2367/00* (2013.01)

(58) Field of Classification Search
CPC .............. B32B 38/18; B32B 2037/268; B32B 2309/105; B32B 2317/00; B65H 2031/414324; C08J 5/24
USPC .......................... 156/289, 324; 131/370–375
See application file for complete search history.

(56) References Cited

U.S. PATENT DOCUMENTS

| | | | | |
|---|---|---|---|---|
| 6,571,803 | B1* | 6/2003 | Bregeard | A24C 5/40 |
| | | | | 131/353 |
| 10,993,473 | B2 | 5/2021 | Malgat | |
| 2008/0271745 | A1* | 11/2008 | Sinclair | A24D 1/022 |
| | | | | 131/365 |
| 2008/0299395 | A1* | 12/2008 | Strange | C08K 3/22 |
| | | | | 428/409 |
| 2015/0099111 | A1* | 4/2015 | Hou | B32B 27/34 |
| | | | | 428/339 |
| 2015/0107610 | A1 | 4/2015 | Metrangolo | |
| 2016/0309781 | A1 | 10/2016 | Malgat | |
| 2016/0331031 | A1 | 11/2016 | Malgat | |

FOREIGN PATENT DOCUMENTS

| | | | | |
|---|---|---|---|---|
| JP | 2016538842 | | 12/2016 | |
| WO | WO-2013178766 A1 * | | 12/2013 | ............. A24B 15/14 |
| WO | WO-2015193031 A1 * | | 12/2015 | ............. A24B 15/14 |

OTHER PUBLICATIONS

Office Action issued in Japan for Application No. 2019-539825 dated Apr. 27, 2022 (8 pages). English translation included.

* cited by examiner

METHOD FOR PRODUCING A BOBBIN COMPRISING ALKALOIDS CONTAINING MATERIAL

This application is a U.S. National Stage Application of International Application No. PCT/EP2018/057939 filed Mar. 28, 2018, which was published in English on Oct. 4, 2018, as International Publication No. WO 2018/178161 A1. International Application No. PCT/EP2018/057939 claims priority to European Application No. 17163657.4 filed Mar. 29, 2017.

The present invention is related to a method for producing a bobbin comprising alkaloids containing material, such as homogenized tobacco material.

Today, in the manufacture of tobacco products, besides tobacco leaves, also homogenized tobacco material is used. This homogenized tobacco material is typically manufactured from parts of the tobacco plant that are less suited for the production of cut filler, like, for example, tobacco stems or tobacco dust. Typically, tobacco dust is created as a side product during the handling of the tobacco leaves during manufacture.

The most commonly used forms of homogenized tobacco material are reconstituted tobacco sheet and cast leaf. The process to form homogenized tobacco material sheets commonly comprises a step in which ground tobacco and a binder are mixed to form a slurry, which typically may comprise from about 150 percent and about 500 percent in dry weight basis of water. The slurry is then used to create a tobacco web or sheet, for example by casting a viscous slurry onto a moving metal belt to produce so called cast leaf. Alternatively, a slurry with low viscosity and high water content can be used to create reconstituted tobacco in a process that resembles paper-making.

The sheet or web of homogenized tobacco material is then rolled in bobbins which needs to be unwound in order to be further processed and included in the aerosol-forming substrate of the aerosol-forming article.

Unwinding such bobbins can be however a difficult task. The homogenized tobacco material sheet, when coiled in bobbins, is indeed difficult to unwind due to its consistency, sensitivity to heat, stickiness and low tensile strength: it could easily be torn apart and, if too high tensile strength is used to un-stuck the sheets, the sheets could break.

Furthermore, these bobbins are difficult to transport and are furthermore currently consumed within a very short timeframe, since otherwise the sheets of homogenized tobacco materials bond together and quite definitively compromise unwinding. Consequently, building up a safety-stock of such bobbins can be a difficult task as well.

There is therefore a need of a method for producing a bobbin from a sheet of material comprising alkaloids, such as homogenized tobacco material, that is easily stored, transported and unwound, and that therefore allows to provide a continuous, constant and regular feed of homogenized tobacco material so that the rest of the production line can increase the overall production rate.

The invention may satisfy at least one of the above needs.

In an aspect, the invention relates to a method for producing a bobbin comprising a plurality of windings of a laminated sheet, the method comprising the steps of: providing a continuous sheet of an alkaloids containing material having a free surface; providing a continuous sheet of a first protective material having a free surface; adhering the free surface of the continuous sheet of the first protective material to the free surface of the continuous sheet of alkaloids containing material to form a continuous laminated sheet comprising at least one layer of alkaloids containing material and at least one layer of a first protective material, wherein said at least one layer of alkaloids containing material and said at least one layer of a first protective material define an adhesion surface between them; feeding said laminated sheet to a rotatable center core; and rotating the center core so as to wind said continuous laminated sheet around it in such a way to form said bobbin comprising a plurality of windings of a continuous laminated sheet comprising at least one layer of alkaloids containing material and at least one layer of a first protective material.

The alkaloids containing material is wound up into a bobbin forming a plurality of layers one above the others. In the method of the invention, during the bobbin formation, a sheet of a first protective material between each two consecutive layers of alkaloids containing material is interposed. The sheet of the first protective material acts as a separation foil between two layers of alkaloids containing material. In this way, the individual layers of alkaloids containing material—forming the windings of the bobbin—are separated one from the others, thus preventing their bonding together, which otherwise may take place due to their "stickiness". The unwinding and the feeding of the so formed laminated sheet to the production line is thus possibly facilitated.

As used herein, the term "sheet" denotes a laminar element having a width and length substantially greater than the thickness thereof. The width of a sheet is preferably greater than 10 millimeters, more preferably greater than about 20 millimeters or about 30 millimeters. Even more preferably, the width of the sheet is comprised between about 100 millimeters and about 300 millimeters.

An "alkaloids containing material" is a material which contains one or more alkaloids. Amond alkaloids, nicotine is a preferred one, which can be found in tobacco.

Alkaloids are a group of naturally occurring chemical compounds that mostly contain basic nitrogen atoms. This group also includes some related compounds with neutral and even weakly acidic properties. Some synthetic compounds of similar structure are also termed alkaloids. In addition to carbon, hydrogen and nitrogen, alkaloids may also contain oxygen, sulfur and, more rarely, other elements such as chlorine, bromine, and phosphorus.

Alkaloids are produced by a large variety of organisms including bacteria, fungi, plants, and animals. They can be purified from crude extracts of these organisms by acid-base extraction. Caffeine, nicotine, theobromine, atropine, tubocurarine are examples of alkaloids.

As used herein, the term "homogenised tobacco material" denotes material formed by agglomerating particulate tobacco, which contains the alkaloid nicotine.

A homogenised tobacco material may be in the form of a sheet. The homogenised tobacco material may have an aerosol-former content of greater than about 5 percent on a dry weight basis. The homogenised tobacco material may alternatively have an aerosol former content of between about 5 percent and about 30 percent by weight on a dry weight basis. Sheets of homogenised tobacco material may be formed by agglomerating particulate tobacco obtained by grinding or otherwise comminuting one or both of tobacco leaf lamina and tobacco leaf stems; alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and nonaqueous solvents and combinations thereof.

Examples of suitable aerosol formers are glycerine and propylene glycol.

Once a sheet of alkaloids containing material is produced, such as a sheet of homogenized tobacco material, it often needs to be stored at least for a certain time before it is further processed. In order to store it properly, without or with minimal risks of breakage or without occupying too much space, it is commonly wound into bobbins. However, winding the alkaloids containing sheet in a bobbin as such may create several problems in the subsequent unwinding, due to the "sticky" properties of the sheets. Due to the fact that the alkaloids containing sheet is sticky, the layers formed in the bobbin by the sheet wound in itself are prone to glue one onto the others, preventing unwinding.

In order to simplify the unwinding, according to the invention the bobbin is formed not only winding the sheet of alkaloids containing material into a bobbin, but also winding a sheet of a first protective material. The two sheets are wound together so that the resulting bobbin is a layered bobbin in which between every two subsequent layers of the alkaloids containing material, a layer of protective sheet is sandwiched therebetween. This is achieved winding the two sheets together so that a free surface of the alkaloids containing sheet adheres to a free surface of the first protective material sheet. The adhesion ensures that the two sheets do not move one with respect to the other. The "double sheet" forms a laminated sheet and its winding creates a bobbin of windings of a laminated sheet. Due to the fact that there is no direct contact between different layers of the alkaloids containing sheet, the unwinding of the bobbin is simplified.

Preferably, the alkaloids containing material includes a homogenized tobacco material. Preferably, the alkaloids containing material may contain a single alkaloid, or more than a single alkaloid.

Preferably, the continuous sheet of alkaloids containing material has a moisture content comprised between from about 7 percent to about 15 percent in total weight basis of the sheet, more preferably from about 9 percent to about 13 percent in total weight basis of the sheet. At this moisture content, the sheet is substantially solid and relatively easy to handle.

Preferably, the method of the invention comprises the step of unwinding a mother bobbin comprising a wound continuous sheet of alkaloids containing material in such a way to provide the continuous sheet of alkaloids containing material. In this way, the method of the invention may also be used for producing bobbins comprising a plurality of windings of a laminated sheet, even starting from previously prepared bobbins of alkaloids containing materials. Preferably, this step of unwinding a mother bobbin takes place before providing a continuous sheet of alkaloids containing material having a free surface.

Preferably, the continuous sheet of alkaloids containing material has a thickness comprised between about 100 micron and about 300 micron and a width from between about 0.1 meters to about 2 meters. Preferably, the thickness of the alkaloids containing material sheet is the "standard" thickness used for the production of aerosol generating articles, for example of about 200 micron. There is no need of modifying standard process steps.

Preferably, the continuous sheet of a first protective material has a thickness comprised between about 5 micron and about 50 micron. More preferably, the thickness is comprised between about 5 micron and about 20 micron. In this way, the sheet of the first protective material has a thickness sufficient to separate the layers of alkaloids containing material without representing an excessive weight fraction of the bobbin therewith produced.

Preferably, the first protective material which is used in the method of the invention may be made of any suitable material or materials. More preferably, the first protective material is selected from the group consisting of polypropylene, polyethylene, polytetrafluoroethylene, polyester, paper. These material have the property that they avoid or minimize the gluing of one layer onto the others in the bobbin.

Preferably, the method of the invention includes applying a release agent on the free surface of the continuous sheet of a first protective material. More preferably, the release agent is selected from the group consisting of glycerin, cellulose liquid based, talc or calcium mixture liquid based, tobacco powder. The release agent has the function of facilitating the unwinding of the bobbin and the separation of the layer of alkaloids containing materials from the layer of the first protective material at the level of the adhesion surface. Preferably, this step of applying the release agent takes place before adhering the free surface of the continuous sheet of the first protective material to the free surface of the continuous sheet of alkaloids containing material.

Preferably, the method of the invention comprises passing the continuous sheet of alkaloids containing material through at least one roller in such a way to strain and to feed the continuous sheet of alkaloids containing material to the step of the free surface of the continuous sheet of the first protective material to the free surface of the continuous sheet of alkaloids containing material to form a continuous laminated sheet comprising at least one layer of alkaloids containing material and at least one layer of a first protective material.

Preferably, the step of providing a continuous sheet of a first protective material having a free surface comprises passing the continuous sheet of a first protective material through at least one roller in such a way to strain and to feed the continuous sheet of alkaloids containing material.

Preferably, the method of the invention comprises passing the continuous sheet of alkaloids containing material and the continuous sheet of a first protective material through a pair rollers in such a way to press the free surface of the continuous sheet of said first protective material to the free surface of the continuous sheet of alkaloids containing material. In this way, adhesion between the continuous sheet of alkaloids containing material and the continuous sheet of a first protective material is improved.

Preferably, the method of the invention comprises the step of cutting said continuous laminated sheet in a direction which is substantially perpendicular to an adhesion surface defined by said at least one layer of alkaloids containing material and at least one layer of a first protective material, in such a way to provide two continuous laminated sheets, each comprising one layer of alkaloids containing material and one layer of a first protective material. Preferably, this step takes place before the step of feeding said laminated sheet to a rotatable center core.

Preferably, said continuous laminated sheet is fed to said rotatable center core at a speed between about 10 meters/ minute and about 500 meters/minute. Preferably, this step takes place while feeding said laminated sheet to a rotatable center core. A relatively high speed of production is thus obtained.

Preferably, in the step of rotating the rotatable center core so as to wind said continuous laminated sheet around it in such a way to form said bobbin comprising a plurality of windings of a continuous laminated sheet comprising at least one layer of alkaloids containing material and at least one layer of a first protective material, the rotation speed of said rotatable center core is for having a linear speed of material from about 10 meters/minute to about 500 meters/minute.

Preferably, the method of the invention comprises the step of applying a layer of a second protective material outwardly to said plurality of windings. More preferably, the layer of a second protective material is applied by wrapping the sheet of the second protective material outwardly to said plurality of windings. In this way, the alkaloids containing material of the bobbin is protected, preventing external contaminations that may after the quality of the material. Preferably, this step takes place after the step of rotating the rotatable center core so as to wind said continuous laminated sheet around it in such a way to form said bobbin comprising a plurality of windings of a continuous laminated sheet comprising at least one layer of alkaloids containing material and at least one layer of a first protective material. Preferably, the second protective material which is used in the method of the invention may be made of any suitable material or materials. More preferably, the second protective material is selected from the group consisting of polypropylene, polyethylene, polytetrafluoroethylene, polyester, paper.

According to a further aspect, the invention relates to a bobbin comprising a plurality of windings of a continuous laminated sheet comprising at least one layer of alkaloids containing material and at least one layer of a first protective material, wherein said at least one layer of alkaloids containing material and said at least one layer of a first protective material define an adhesion surface between them.

The advantages of this bobbin have been already outlined with reference to the above method according to the invention and are not repeated herewith.

The bobbin shape can be any. It can have a substantially cylindrical shape, however an oval or anyhow deformed shape, such as a bobbin with bulges deforming a underlying cylindrical shape, does not hinder the application of the teaching of the invention.

Preferably, in said bobbin said at least one layer of alkaloids containing material has a thickness comprised between about 100 micron and about 300 micron.

Preferably, the at least one layer of alkaloids containing material includes at least a layer of homogenized tobacco material.

Preferably, the at least one layer of alkaloids containing material has a moisture content comprised between from about 7 percent to about 15 percent in total weight basis of the layer, more preferably from about 9 percent to about 13 percent in total weight basis of the layer. At this moisture content, the layer is substantially solid and relatively easy to handle.

Preferably, said at least one layer of a first protective material has a thickness comprised between about 5 micron and about 50 micron. In this way, the layer has a thickness sufficient to separate the layers of alkaloids containing material without representing an excessive weight fraction of the bobbin therewith produced.

Preferably, the first protective material which is used in the bobbin of the invention may be made of any suitable material or materials. More preferably, the first protective material is selected from the group consisting of polypropylene, polyethylene, polytetrafluoroethylene, polyester, paper.

Preferably, the bobbin of the invention comprises an agent applied on at least one side of said at least one layer of a first protective material, said side adhering to at least one side of said at least one layer of alkaloids containing material. More preferably, said at least one release agent is selected from the group consisting of glycerin, cellulose liquid based, tobacco powder, talc or calcium mixture liquid based.

Preferably, the bobbin of the invention comprises a layer of a second protective material outwardly to said plurality of wounds. In this way, the alkaloids containing material of the bobbin is protected, preventing external contaminations that may after the quality of the material.

Preferably, said second protective material which is used in the bobbin of the invention may be made of any suitable material or materials. More preferably, said second protective material is selected from the group consisting of polypropylene, polyethylene, polytetrafluoroethylene, polyester, paper.

Preferably, the bobbin of the invention is used in a method for producing an aerosol generating article including alkaloids containing material, said method comprising the step of unwinding said bobbin formed according to the previous aspect of the invention.

Aerosol forming articles according to the present invention may be in the form of filter cigarettes or other smoking articles in which tobacco material is combusted to form smoke. The present invention additionally encompasses articles in which tobacco material is heated to form an aerosol, rather than combusted, and articles in which a nicotine-containing aerosol is generated from a tobacco material without combustion or heating.

Aerosol forming articles according to the invention may be whole, assembled aerosol forming articles or components of aerosol forming articles that are combined with one or more other components in order to provide an assembled article for producing an aerosol, such as for example, the consumable part of a heated smoking device.

An aerosol forming article may be an article that generates an aerosol that is directly inhalable into a user's lungs through the user's mouth. An aerosol forming article may resemble a conventional smoking article, such as a cigarette and may comprise tobacco. An aerosol forming article may be disposable. An aerosol forming article may alternatively be partially-reusable and comprise a replenishable or replaceable aerosol forming substrate.

An aerosol forming article may also include a combustible cigarette. In preferred embodiments, the aerosol forming-article may be substantially cylindrical in shape. The aerosol forming article may be substantially elongated. The aerosol forming article may have a length and a circumference substantially perpendicular to the length. The aerosol forming article may have a total length between approximately about 30 millimeters and approximately about 100 millimeters. The aerosol forming article may have an external diameter between approximately about 5 millimeters and approximately about 12 millimeters.

Disclosed is also herein an apparatus for producing a bobbin comprising a plurality of windings of a laminated sheet, said apparatus including:
  a first feed path adapted to feed a continuous sheet of
    alkaloids containing material having a free surface;
  a second feed path adapted to feed a continuous sheet of
    a first protective material having a free surface;

an adhesion device adapted to adhere the free surface of the continuous sheet of the first protective material to the free surface of the continuous sheet of alkaloids containing material, in such a way to form a continuous laminated sheet comprising at least one layer of alkaloids containing material and at least one layer of a first protective material, wherein said at least one layer of alkaloids containing material and said at least one layer of a first protective material define an adhesion surface between them;

a rotatable center core around which said continuous laminated sheet is wound;

a motor to rotate said rotatable center core in order to wind said laminated sheet around said rotatable center core.

The advantages of this apparatus have been already outlined with reference to the above method and to the above bobbin and are not repeated herewith.

Preferably, said apparatus includes an unwinding device adapted to unwind a mother bobbin comprising a wound sheet of alkaloids containing material in such a way to provide said continuous sheet of alkaloids containing material.

Preferably, said apparatus includes an unwinding device adapted to unwind a mother bobbin comprising a wound sheet of a first protective material in such a way to provide said continuous sheet of first protective material.

Preferably, said first feed path includes a series of rollers through which said continuous sheet of alkaloids containing material passes and is adapted to strain and to guide the continuous sheet of alkaloids containing material to the adhering device.

Preferably, said second feed path includes a series of rollers through which said continuous sheet of first protective material passes and is adapted to strain and to guide the continuous sheet of first protective material to the adhering device.

Preferably, said apparatus includes a release agent dosing station positioned at a point upstream to said adhesion device and adapted to dose a release agent to apply a release agent to said free surface of said continuous sheet of a first protective material.

Preferably, said adhesion device includes an adhesion element. More preferably, said adhesion device includes an adhesion element which is pair of rollers through which said continuous sheet of alkaloids containing material and said continuous sheet of a first protective material pass and is adapted to press said free surface of said continuous sheet of a first protective material to said free surface of said continuous sheet of alkaloids containing material. In this way, adhesion between the continuous sheet of alkaloids containing material and the continuous sheet of a first protective material is improved.

Preferably, the apparatus of the invention includes a cutting device positioned at a position downstream to said adhesion device and adapted to cut the continuous laminated sheet in a direction which is substantially perpendicular to an adhesion surface defined by said at least one layer of alkaloids containing material and at least one layer of a first protective material, to provide two continuous laminated sheets, each comprising at least one layer of alkaloids containing material and at least one layer of a first protective material Preferably, said motor is adapted to rotate said rotatable center core at a rotation speed corresponding a linear speed of material from about 10 meters/minute to about 500 meters/minute.

Preferably, said apparatus includes an external layer application device, which is adapted to apply a layer of a second protective material outwardly to said plurality of windings.

More preferably, said external layer application device includes a wrapping station adapted to wrap at least one sheet of said second protective material outwardly to said plurality of windings.

Specific embodiments of the invention will be further described, by way of example only, with reference to the accompanying drawings in which.

Figure 1:
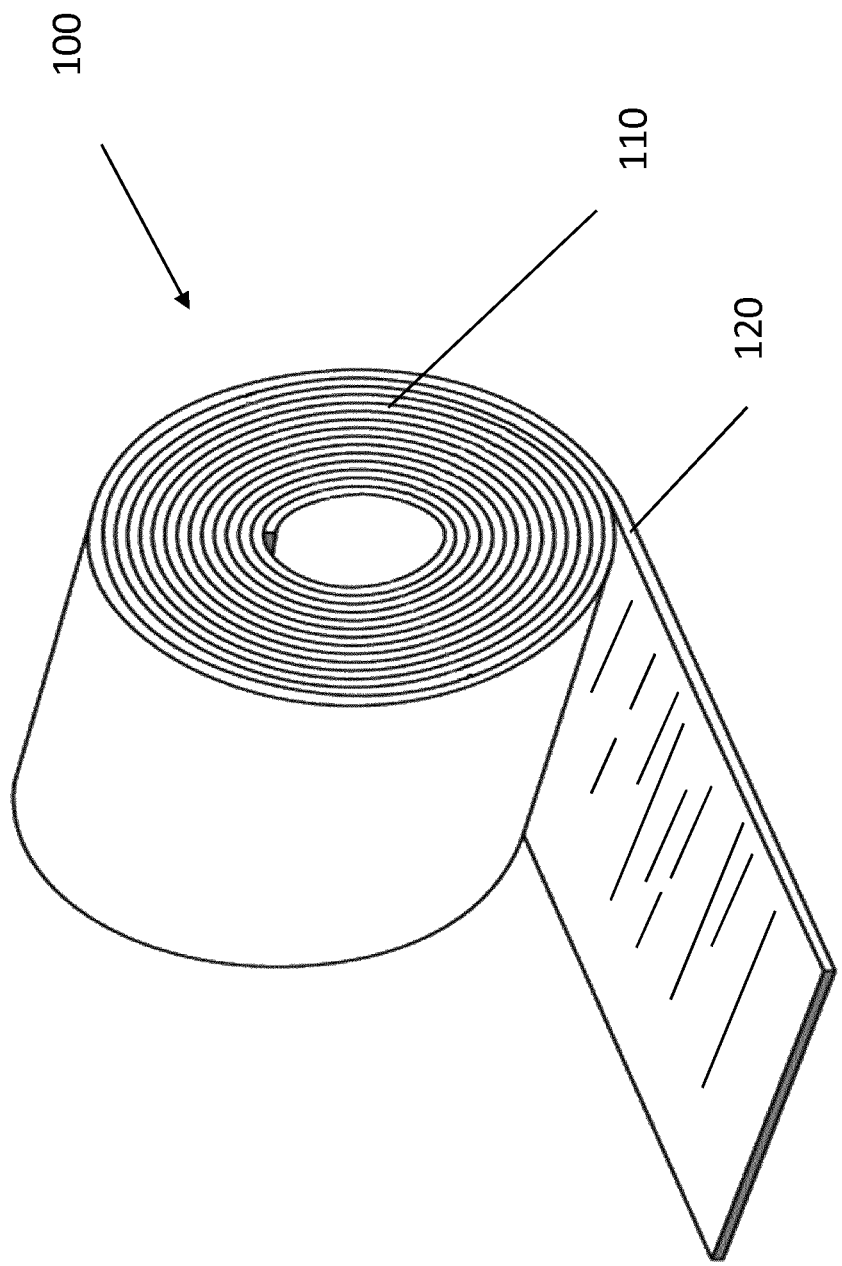
FIG. 1 is a perspective view of a bobbin of the invention.

In FIG. 1 a perspective view of a bobbin 100 realized according to the invention is shown.

Bobbin 100 comprises a plurality of windings 110 of a continuous laminated sheet 120.

Figure 2:
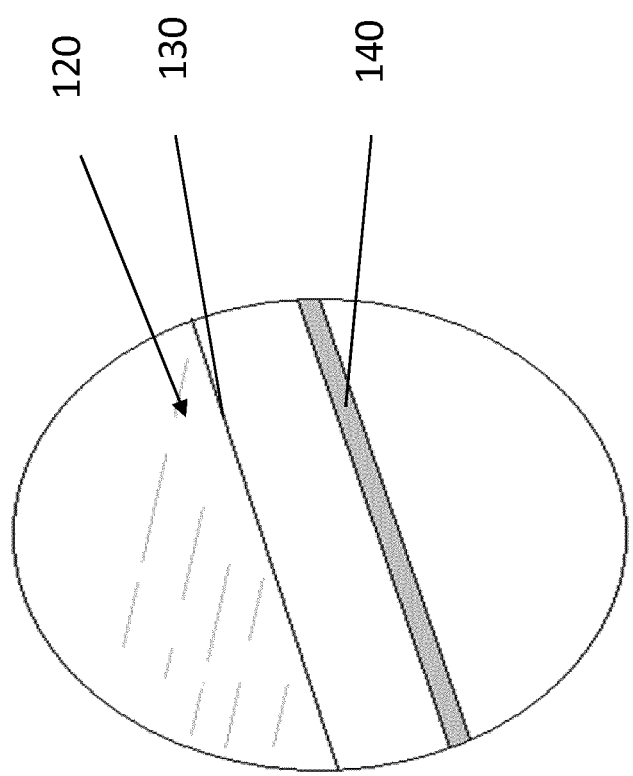
FIG. 2 is a perspective view, on an enlarged scale, of a continuous laminated sheet comprising one layer of alkaloids containing material and one layer of a first protective material.

As depicted in more detail in FIG. 2, said laminated sheet 120 comprises one layer of homogenized tobacco material 130 as alkaloids containing material and one layer of a first protective material 140. The first protective material is paper or polypropylene.

Layer of a first protective material 140 adheres to layer of homogenized tobacco material 130, thus defining an adhesion surface between them between a free surface of the first protective material and a free surface of the homogenized tobacco material 140, as better detailed below, the free surface of the first protective material facing the free surface of the homogenized tobacco material.

Figure 3:
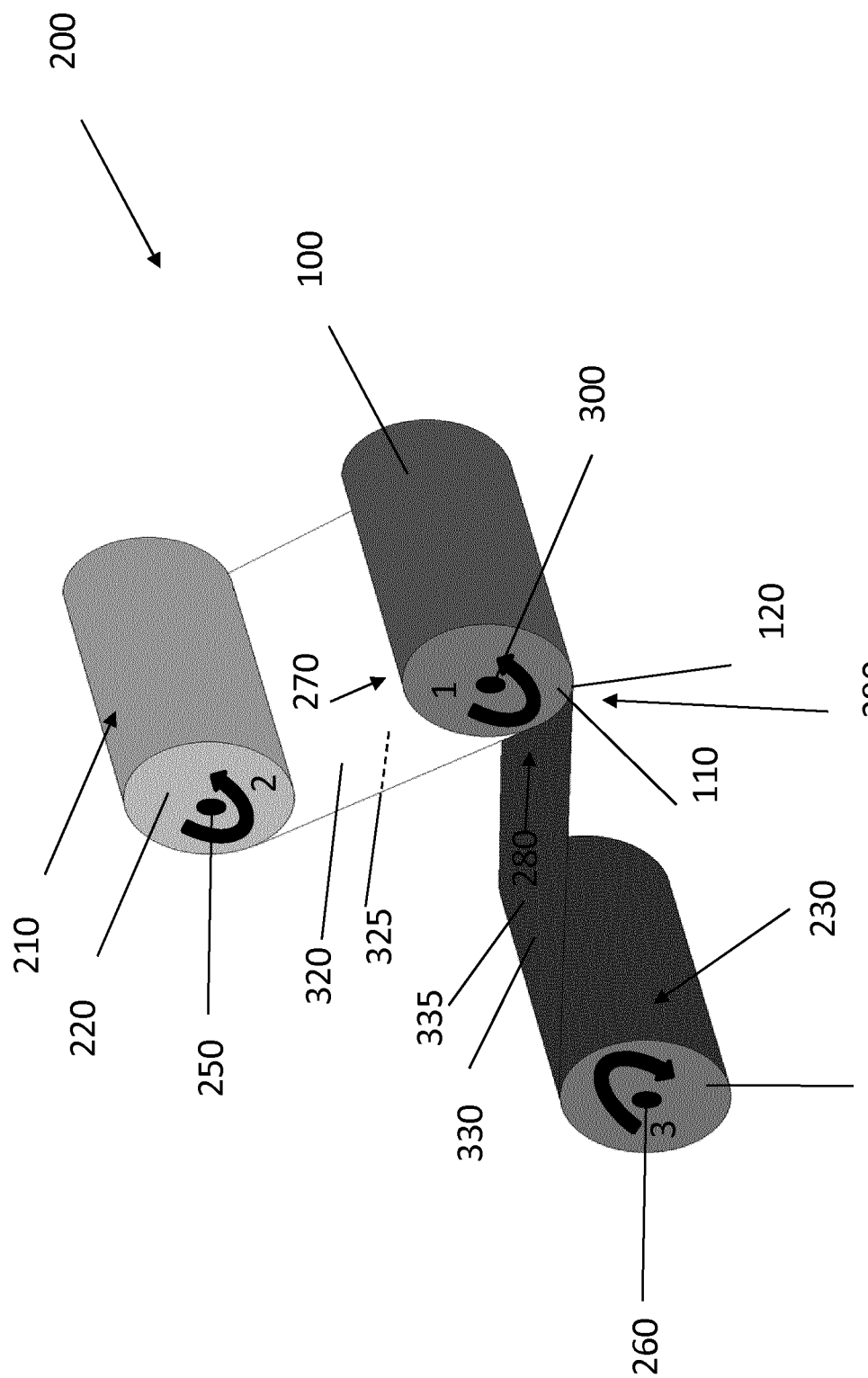
FIG. 3 is a perspective view of a first variant of the apparatus for producing the bobbin of the invention.

In FIG. 3 a perspective view of a first variant of apparatus 200 for producing bobbin 100 is shown.

In FIG. 3 apparatus 200 includes a first mother bobbin 210 comprising a wound sheet of homogenized tobacco material 220, a second mother bobbin 230 comprising a wound sheet of a first protective material 240, a first unwinding device 250 adapted to unwind said first mother bobbin 210 of homogenized tobacco material, a second unwinding device 260 adapted to unwind said second mother bobbin 230 of first protective material, a first feed path 270, and second feed path 280, an adhesion device 290, a rotatable center core 300. Each unwinding device 250, 260 includes a motor, which is not depicted in the drawings.

First unwinding device 250 includes a rotatable center core around which first mother bobbin 210 is wound and rotates in the sense indicated by arrow 2. First unwinding device 250 unwinds from first mother bobbin 210 the wound sheet of homogenized tobacco material 220, thus providing a continuous sheet of homogenized tobacco material 320. Continuous sheet of homogenized tobacco material 320 has a free surface 325.

Second unwinding device 260 includes a rotatable center core around which second mother bobbin 230 is wound, it rotates in the sense indicated by arrow 3 and unwinds from second mother bobbin 230 the wound sheet of a first protective material 240, thus providing a continuous sheet of a first protective material 330. Continuous sheet of a first protective material 330 has a free surface 335.

Continuous sheet of homogenized tobacco material 320 and continuous sheet of a first protective material 330 are fed respectively through the first feed path 270 and the second feed path 280 to adhesion device 290.

The sheet of homogenized tobacco material and the sheet of first protective material are fed to adhesion device 290 including a rotatable center core 300.

In the adhesion device 290, the free surface 335 of continuous sheet of the first protective material 330 is adhered to free surface 325 of continuous sheet of homogenized tobacco material 320, in such a way to form a continuous laminated sheet 120 comprising one layer of homogenized tobacco material 130 and one layer of a first protective material 140 (as shown in detail in FIG. 2), wherein said at least one layer of homogenized tobacco material 130 and said at least one layer of a first protective material 140 define an adhesion surface between them.

A motor (not depicted in the drawings) rotates rotatable center core 300 in the sense indicated by arrow 1, so that laminated sheet 120 is wound around rotatable center core 300, forming a bobbin 100 comprising a plurality of windings 110 of a continuous laminated sheet 120 comprising one layer of homogenized tobacco material 130 and one layer of a first protective material 140 (as shown in detail in FIG. 2).

It is clear from the drawings that the bobbin of laminated sheet has a plurality of windings and between two consequent windings of homogenized tobacco sheet a sheet of first protective material is interposed.

Figure 4:
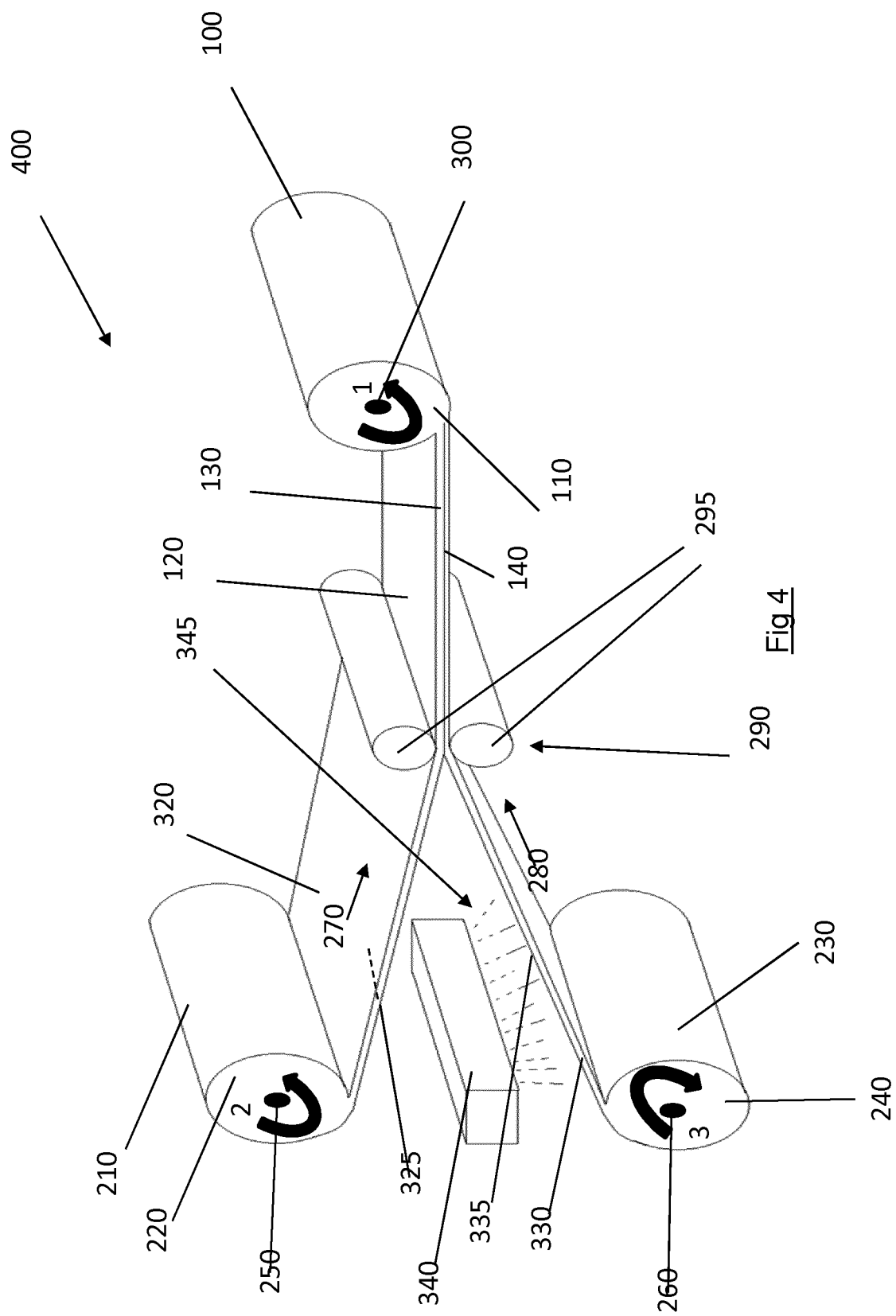
FIG. 4 is a perspective view of a second variant of the apparatus for producing the bobbin of the invention.

FIG. 4 shows a perspective view of a second variant of apparatus 400 for producing bobbin 100.

In FIG. 4, apparatus 400 includes a first mother bobbin 210 comprising a wound sheet of homogenized tobacco material 220, a second mother bobbin 230 comprising a wound sheet of a first protective material 240, a first unwinding device 250 adapted to unwind said first mother bobbin 210, a second unwinding device 260 adapted to unwind said second mother bobbin 230, a first feed path 270, a second feed path 280, a release agent dosing station 340, an adhesion device 290, a rotatable center core 300, and at least motor (not depicted in the drawings) to rotate the unwinding devices 250, 260.

First unwinding device 250 includes a rotatable center core around which mother bobbin 210 is wound, it rotates in the sense indicated by arrow 2 and unwinds from first mother bobbin 210 the wound sheet of homogenized tobacco material 220, thus providing a continuous sheet of homogenized tobacco material 320. Continuous sheet of homogenized tobacco material 320 has a free surface 325.

Second unwinding device 260 includes a rotatable center core around which second mother bobbin 230 is wound, rotates in the sense indicated by arrow 3 and unwinds from second mother bobbin 230 the wound sheet of a first protective material 240, thus providing a continuous sheet of a first protective material 330. Continuous sheet of a first protective material has a free surface 335. The first protective material is paper or polypropylene.

Release agent dosing station 340 doses a release agent 345 on free surface 335 of continuous sheet of a first protective material 330. The release agent 345 is glycerin.

Adhesion device 290 includes a pair of rollers 295.

Continuous sheet of homogenized tobacco material 320 and continuous sheet of a first protective material 330 are fed respectively through first feed path 270 second feed path 280 to adhesion device 290 and pass through said pair of rollers 295.

Continuous sheet of homogenized tobacco material 320 and continuous sheet of a first protective material 330 pass through pair of rollers 295 of the adhesion device 290 and the free surface 335 of continuous sheet of the first protective material 330 adhere to the free surface 325 of continuous sheet of homogenized tobacco material 320, in such a way to form a continuous laminated sheet 120 comprising one layer of homogenized tobacco material 130 and one layer of a first protective material 140 (as shown in detail in FIG. 2).

A motor (not depicted in FIG. 4) rotates rotatable center core 300 in the sense indicated by arrow 1 and laminated sheet 120 is wound around rotatable center core 300, thus forming a bobbin 100 comprising a plurality of windings 110 of a continuous laminated sheet 120 comprising one layer of homogenized tobacco material 130 and one layer of a first protective material 140 adhering thereto.

Figure 5:
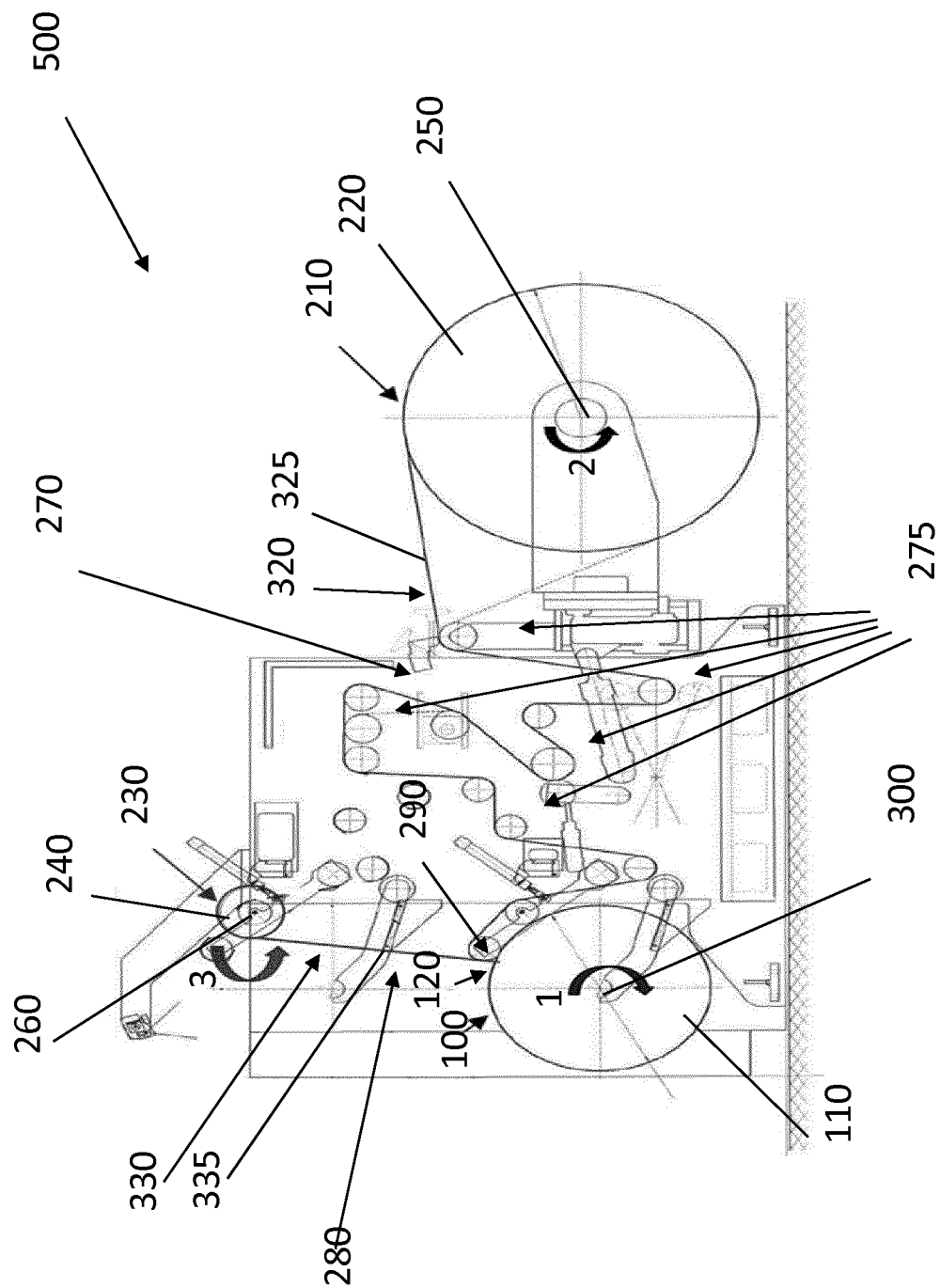
FIG. 5 is a side view of a third variant of the apparatus for producing the bobbin of the invention.

In FIG. 5 a side view of a third variant of the apparatus 500 for producing bobbin 100 is shown.

In FIG. 5, apparatus 500 includes a first mother bobbin 210 comprising a wound sheet of homogenized tobacco material 220, a second mother bobbin 230 comprising a wound sheet of a first protective material 240, a first unwinding device 250 adapted to unwind said mother bobbin 210, a second unwinding device 260 adapted to unwind said second mother bobbin 230, a first feed path 270, a second feed path 280, an adhesion device 290, a rotatable center core 300, and a motor (not depicted in FIG. 5).

First unwinding device 250 includes a rotatable center core around which the first mother bobbin 210 is wound, it rotates in the sense indicated by arrow 2 and unwinds from first mother bobbin 210 the wound sheet of homogenized tobacco material 220, thus providing a continuous sheet of homogenized tobacco material 320. Continuous sheet of homogenized tobacco material 320 has a free surface 325.

Second unwinding device 260 includes a rotatable center core around which second mother bobbin 230 is wound, it rotates in the sense indicated by arrow 3 and unwinds from second mother bobbin 230 the wound sheet of a first protective material 240, thus providing a continuous sheet of a first protective material 330. Continuous sheet of a first protective material 330 has a free surface 335. The first protective material is a mixture of glycerin, or cellulose liquid based, talc or calcium mixture liquid based.

First feed path 270 includes rollers 275, used for tensioning and aligning material during process.

Continuous sheet of homogenized tobacco material 320 passes through rollers 275 of first feed path 270 and is fed to adhesion device 290.

Continuous sheet of a first protective material 330 is fed through second feed path 280 to adhesion device 290.

Adhesion device 290 is adapted to adhere free surface 335 of continuous sheet of the first protective material 330 to free surface 325 of continuous sheet of homogenized tobacco material 320, in such a way to form a continuous laminated sheet 120 comprising one layer of homogenized tobacco material 130 and one layer of a first protective material 140.

Motor (not depicted in FIG. 5) rotates rotatable center core 300 in the sense indicated by arrow 1 and laminated sheet 120 is wound around rotatable center core 300, thus forming a bobbin 100 comprising a plurality of wounds 110 of a continuous laminated sheet 120 comprising one layer of homogenized tobacco material 130 and one layer of a first protective material 140.

Figure 6:
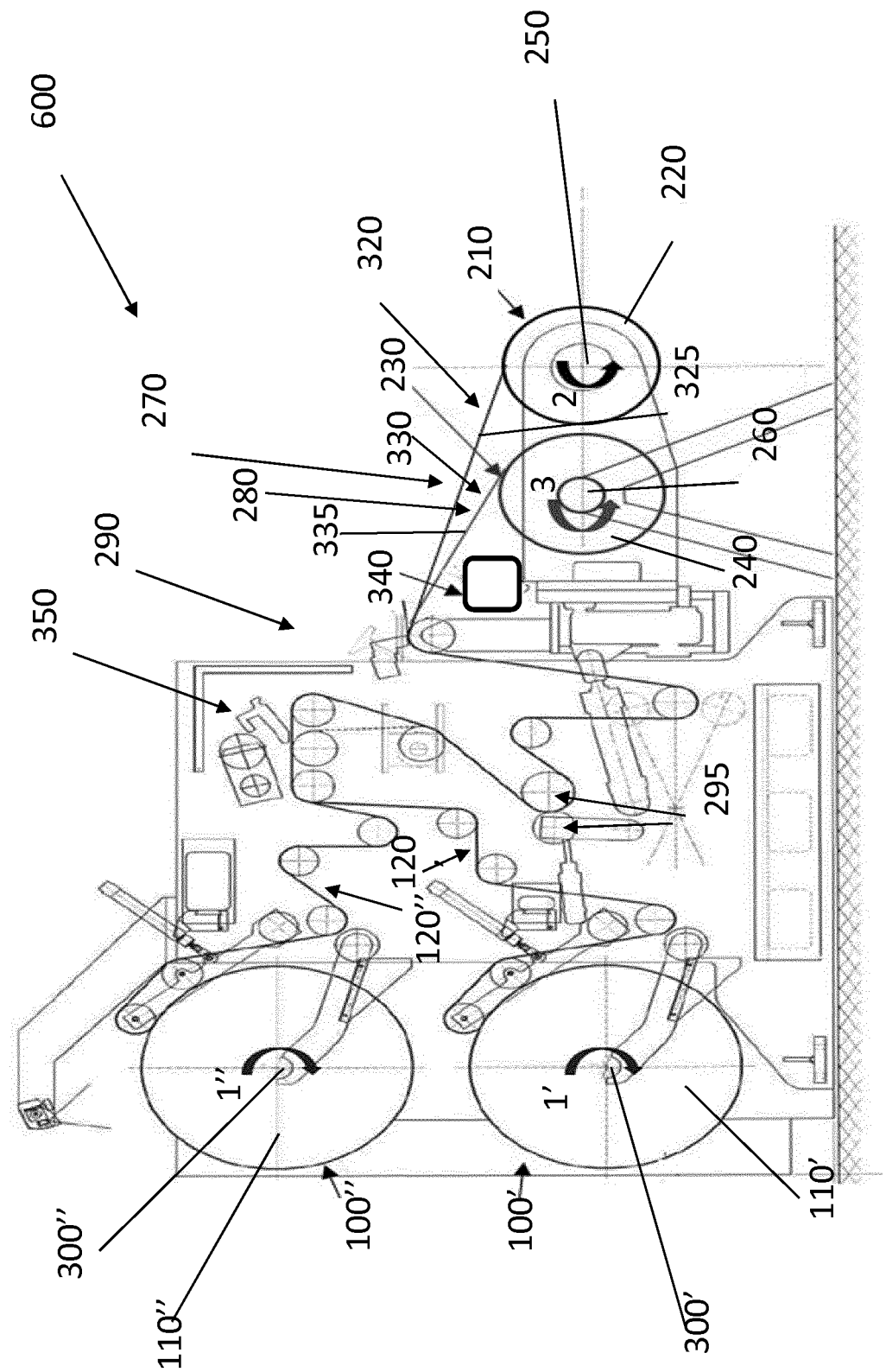
FIG. 6 is a side view of a fourth variant of the apparatus for producing the bobbin of the invention.

In FIG. 6 a side view of a fourth variant of the apparatus 600 for producing two bobbins 100' and 100" is shown.

In FIG. 6, apparatus 600 includes a first mother bobbin 210 comprising a wound sheet of homogenized tobacco material 220, a second mother bobbin 230 comprising a wound sheet of a first protective material 240, a first unwinding device 250 adapted to unwind said first mother bobbin 210, a second unwinding device 260 adapted to unwind said mother bobbin 230, a first feed path 270, a second feed path 280, a release agent dosing station 340, an adhesion device 290, a cutting device 350, two rotatable center cores 300' and 300", and two motors, not depicted in the drawings, to rotate the center cores 300', 300".

First unwinding device 250 includes the rotatable center core around which mother bobbin 210 is wound, it rotates in the sense indicated by arrow 2 and unwinds from first mother bobbin 210 the wound sheet of homogenized tobacco material 220, thus providing a continuous sheet of homogenized tobacco material 320. Continuous sheet of homogenized tobacco material 320 has a free surface 325.

Second unwinding device 260 includes the rotatable center core around which second mother bobbin 230 is wound, it rotates in the sense indicated by arrow 3 and unwinds from mother bobbin 230 the wound sheet of a first protective material 240, thus providing a continuous sheet of a first protective material 330. Continuous sheet of a first protective material has a free surface 335. The first protective material is a mixture of glycerin, or cellulose liquid based, talc or calcium mixture liquid based.

Release agent dosing station 340 doses a release agent 345 (not shown in FIG. 6) on free surface 335 of continuous sheet of a first protective material 330. The release agent 345 is glycerin.

Continuous sheet of homogenized tobacco material 320 and continuous sheet of a first protective material 330 are fed respectively through first feed path 270 second feed path 280 to adhesion device 290.

Adhesion device 290 includes a pair of rollers 295.

Continuous sheet of homogenized tobacco material 320 and continuous sheet of a first protective material 330 pass through a pair of rollers 295 of the adhesion device 290 and the free surface 335 of continuous sheet of the first protective material 330 adhere to the free surface 325 of continuous sheet of homogenized tobacco material 320, in such a way to form a continuous laminated sheet 120 comprising one layer of homogenized tobacco material 130 and one layer of a first protective material 140.

The apparatus 600 further includes a cutting device 350, positioned downstream the first and second master bobbin, in a direction of unwinding of the homogenized tobacco sheet and the first protective sheet, which is adapted to cut the continuous laminated sheet 120 in a direction which is substantially perpendicular to said adhesion surface 135 and provides two continuous laminated sheets 120' and 120", each comprising one layer of homogenized tobacco material, respectively 130' and 130", and one layer of a first protective material, respectively 140' and 140".

The rotatable center cores 300', 300" are also located downstream the blade.

A first motor (not depicted in FIG. 6) rotates rotatable center core 300' in the sense indicated by arrow 1' and laminated sheet 120' is wound around rotatable center core 300', thus forming a bobbin 100' comprising a plurality of wounds 110' of a continuous laminated sheet 120' comprising one layer of homogenized tobacco material 130' and one layer of a first protective material 140'.

A second motor (not depicted in FIG. 6) rotates rotatable center core 300" in the sense indicated by arrow 1" and laminated sheet 120" is wound around rotatable center core 300", thus forming a bobbin 100" comprising a plurality of wounds 110" of a continuous laminated sheet 120" comprising one layer of homogenized tobacco material 130" and one layer of a first protective material 140".

The invention claimed is:

1. A method for producing a bobbin comprising a plurality of windings of a laminated sheet, the method comprising the steps of:
    providing a continuous sheet of alkaloids containing material having a free surface;
    providing a continuous sheet of a first protective material having a free surface;
        applying a release agent on the free surface of the continuous sheet of a first protective material;
    adhering the free surface of the continuous sheet of the first protective material to the free surface of the continuous sheet of alkaloids containing material to form a continuous laminated sheet comprising at least one layer of alkaloids containing material and at least one layer of a first protective material, wherein said at least one layer of alkaloids containing material and said at least one layer of a first protective material define an adhesion surface between them;
    feeding said laminated sheet to a rotatable center core; and
    rotating the rotatable center core so as to wind said continuous laminated sheet around it in such a way to form said bobbin comprising a plurality of windings of a continuous laminated sheet comprising at least one layer of alkaloids containing material and at least one layer of a first protective material,
    wherein the release agent is selected from the group consisting of glycerin, calcium, talc, cellulose, and tobacco powder.

2. The method according to claim 1, wherein the continuous sheet of alkaloids containing material has a moisture content comprised between from about 7 percent to about 15 percent in total weight basis of the sheet.

3. The method according to claim 1, wherein the continuous sheet of alkaloids containing material has a thickness comprised between about 100 micron and about 300 micron.

4. The method according to claim 1, wherein the continuous sheet of a first protective material has a thickness comprised between about 5 micron and about 50 micron.

5. The method according to claim 1, comprising passing the continuous sheet of alkaloids containing material and the continuous sheet of a first protective material through a pair of rollers in such a way to press the free surface of the continuous sheet of said first protective material onto the free surface of the continuous sheet of alkaloids containing material.

6. The method according to claim 1, comprising the step of applying an outer layer of a second protective material outwardly to the plurality of windings.

7. The method according to claim 6, wherein the outer layer of a second protective material is applied by wrapping at least one sheet of the second protective material outwardly to said plurality of windings.

* * * * *